Patented Apr. 5, 1927.

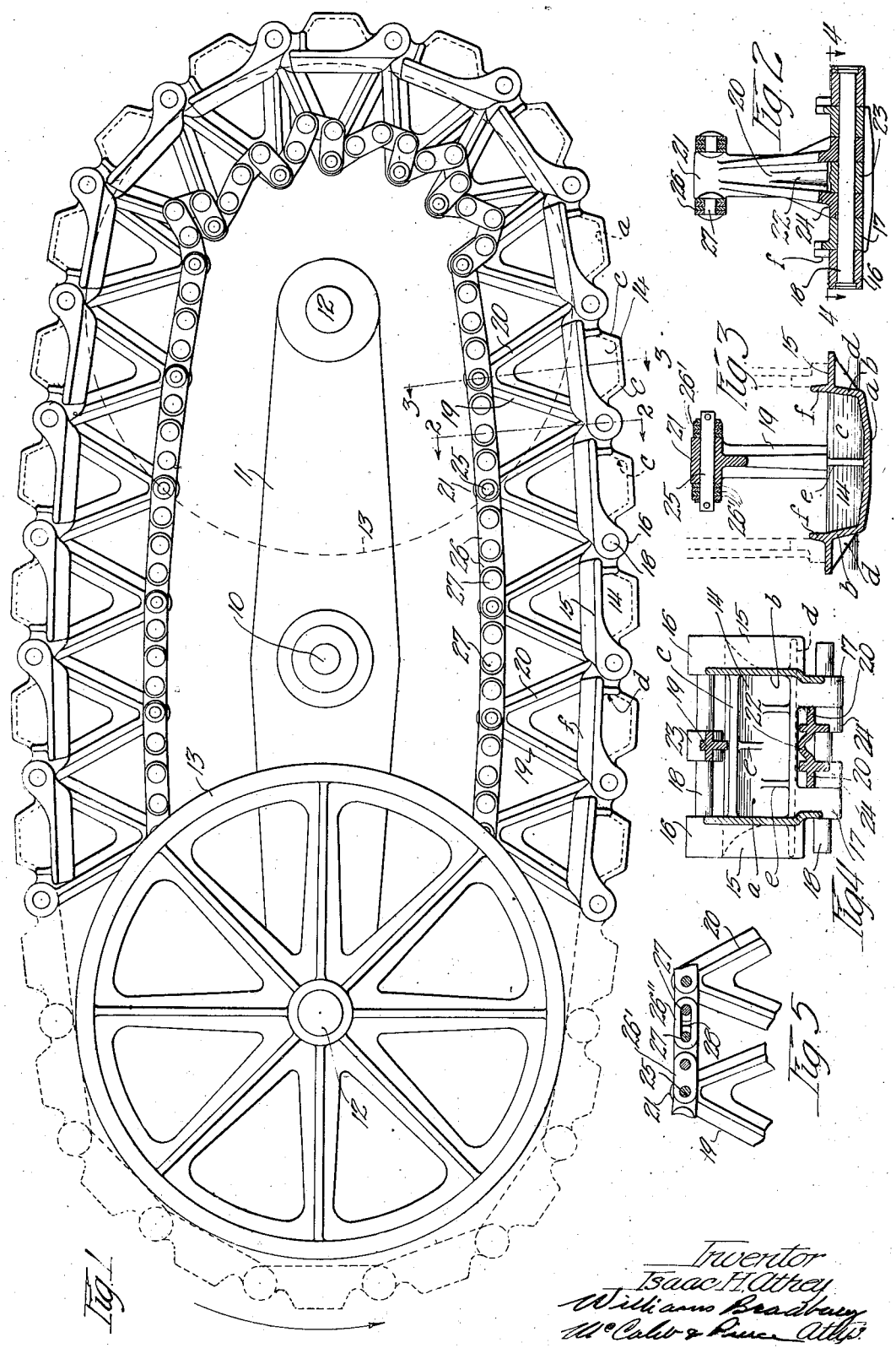

1,623,457

UNITED STATES PATENT OFFICE.

ISAAC H. ATHEY, OF CHICAGO, ILLINOIS, ASSIGNOR TO ATHEY TRUSS WHEEL CO., OF CHICAGO, ILLINOIS, A CORPORATION OF ILLINOIS.

VEHICLE.

Application filed February 1, 1923. Serial No. 616,406.

My invention relates to improvements in vehicles, and is particularly concerned with improvements in that type of vehicle in which the load supporting wheels roll upon an endless track chain.

The objects of my invention are:

First, to provide a vehicle of the character described, comprising a novel track chain formed of a plurality of shoes having inwardly extending truss arms, which are trussed together by novel collapsible means so that that part of the track chain which is carrying the load forms a sort of bridge upon which the load supporting wheels roll.

Second, to provide a track chain of the character described, in which the tread member and the truss arm of each shoe are separately formed, but so designed as to provide a construction of maximum strength.

Third, to provide a shoe for a track chain in which maximum strength is obtained with a minimum amount of material.

Fourth, to provide a shoe forming a part of the track chain, in which the truss arm or arms are so connected with the tread member as to eliminate some of the stresses or strains which are commonly incident to shoes in which the truss arms and tread members are integrally formed.

Fifth, to provide a track chain comprising novel collapsible means for connecting the inner ends of the truss arms forming a part of the track chain, and Sixth, to provide a track chain in which the truss elements or chain and the inner ends of the truss arms are so arranged as to provide maximum resistance against transverse deflection or movement of the various shoes with respect to adjacent shoes.

Other objects will appear as this description progresses, reference being had to the accompanying drawings, in which Figure 1 is a side elevation of a vehicle embodying my invention, one of the load supporting wheels being removed for the purpose of better illustration;

Figure 2 is a transverse section taken on line 2—2 of Figure 1;

Figure 3 is a similar view taken on line 3—3 of Figure 1;

Figure 4 is a horizontal transverse section taken on line 4—4 of Figure 2, and

Figure 5 is a detail side elevation showing a modified form of truss construction.

Throughout the several views, similar reference characters will be used for referring to similar parts.

I have illustrated my invention in connection with a vehicle comprising a load supporting axle 10, upon each end of which is pivoted a beam 11, only one of which is shown. A shaft 12 is mounted in each end of the beam 11 and is of such length that its ends project outwardly from each side of the beam. A load supporting wheel 13 is secured to each end of each shaft 12, so that each end of the beam 11 carries a pair of the load supporting wheels 13.

The track or endless tread chain for supporting the load carrying wheels 13 is formed of a plurality of shoes, each of which comprises a more or less channel-shaped tread member 14, the ends of which are bridged, as indicated at 15, to provide tread surfaces for the wheels 13 to roll upon.

A pair of hinge lugs 16 projects from one side of the channel-shaped tread member in spaced relation, and a similar pair of hinge lugs 17 projects from the opposite side of the tread member in spaced relation, but sufficiently close together so that they fit in between the hinge lugs 16 projecting from the adjacent shoe. Pintles 18 pivotally connect the lugs 16 with the lugs 17 of an adjacent shoe so as to form a flexible track or belt passing around and between the two pairs of wheels carried by the beam 11.

It is desirable that the lower reach of the track chain, that is, the portion of the chain extending from the bottom side of one pair of wheels 13 to the bottom side of the other pair of wheels 13, be so constructed that it acts somewhat like a single rigid link or bridge for supporting the load and distributing the same over a relatively extensive area of ground. To assure this, I provide each shoe with an inwardly extending truss element comprising two converging arms 19 and 20 respectively which are integrally formed at their inner ends and carry a cross head 21, which will later be referred to. Arm 19 is more or less cruciform in cross section, as shown in Figure 4, but the truss arms 20 are formed of a pair of cruciform sections, the lower ends of which are spaced apart and connected by a web portion 22 which, as shown in Figure 4, is concaved inwardly to provide a clearance for the truss arm 19 of the adjacent link when the links fold together, as shown in Figure 1, to pass around the wheels.

The outer end of the truss arm 19 terminates in a bearing block 23 which is received between two similar bearing blocks 24 formed at the outer ends of the elements forming the truss arm 20. The bearing blocks 23 and 24 are provided with openings registering with the bores of the hinge lugs 17 and 16, and the pintles 18 pass through the bores in these bearing blocks so that the outer ends of the truss arms are supported by the pintles.

While I have made reference to the elements 23 and 24 as bearing blocks, it is to be clearly understood that this is merely for convenience, and that these elements may or may not form bearings for the pintles 18, as may be desired. Under some conditions, it may be desirable to have the pintles 18 rotate in the elements 23 and 24, and under certain other conditions, it may be desired to have the pintles rigidly secured to these bearing blocks. My invention contemplates both constructions.

Heretofore, so far as I am aware, it has been the practice to cast the truss arms integrally with the tread members, and it sometimes happens that due to too rapid or too uneven cooling of the newly formed castings, certain stresses are set up at the points where the truss arms join the tread members, with the result that breakage very frequently occurs at these points. By the construction which I have just described, these stresses are eliminated. It will also be clearly understood that by forming the truss arms and the tread members separately, the manufacture of the shoes is considerably simplified and cheapened. Repair is likewise simplified and cheapened because the tread shoes and trussing elements may be separately removed and replaced when wear or injury to any part makes repairs necessary or advisable.

A pivot pin 25 extends through and projects from each side of each cross head 21. A pair of truss chains 26 connects the opposite ends of each pivot pin 25 with the corresponding ends of each adjacent pivot pin 25 so as to provide collapsible means for rigidly trussing the inner ends of the truss arms of the shoes forming the lower reach of the track chain. Each of the links of the truss chains 26 is formed from a pair of stampings 26', and the adjacent overlapping ends of these stampings 26' are connected by suitable pivot pins 27, except where the pivot pins 25 perform the same function.

In operation the pivotally interconnected shoes of the tread chain fold together while passing about the rims of the load supporting wheels and unfold into relatively straight bands between the wheels. The pintle supported trussing elements comprising the truss chain likewise fold together while passing about the load supporting wheels and interlock to stiffen the tread chain between the wheels and limit its inward or concave flexure under load.

In Figure 5, I have illustrated a modified form of truss chain connection in which one or more of the links of each portion of the chain lying between adjacent truss arms are formed of one or more stampings 26", having a slot 28 extending lengthwise thereof, which will permit the two pivot pins 27 to approach each other during the initial collapsing movement of the truss chain without any very material deflection of the links from a substantially straight line. This to some extent relieves the truss chains of the sudden snap or whip which might be imparted to them by the construction shown in Figures 1 to 4 inclusive if, through rusting or other cause, there is a tendency for the truss chains to resist the collapsing movement. While I have shown the slot 28 extending from one pivot pin 27 to the other, it will, of course, be understood that any arrangement providing a lost motion connection between these pins and the links would function in the same manner.

I shall now describe more in detail, the details of construction of the tread member of my improved shoe to which I have referred in a general way above. I have so designed this shoe as to afford maximum resistance against the stresses imposed thereon with the minimum amount of material so as to make the shoe, while strong enough to bear the loads imposed upon it, of very light construction. This shoe comprises the bottom plate a, from the edges of which the end plates b and the side plates c (see Figures 1 and 3) diverge upwardly. The bridge members 15 extend outwardly beyond or away from the end plates b and are preferably supported by the brackets d, which are formed integrally with the end plates and the bridge members. Similar brackets e act as reinforcements between the side members c and the bottom plate a. From an inspection of Figure 4, it will be seen that the hinge lugs 16 are formed integrally with and project outwardly beyond the end plates b. A flange f projects upwardly from the inner edge of each bridge member 15, and in substantial alignment with the end plate b at that end of the shoe. These flanges provide means for aligning the shoe with the load supporting wheels before the latter roll upon the shoes.

By providing a pair of truss chains arranged on opposite sides of the truss arms and spaced from the longitudinal center line of the track chain, I have provided a construction which is more rigid against lateral deflection or movement of the links with respect to each other than those constructions in which a single truss chain is placed substantially upon the longitudinal center line of the track chain.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A track chain formed of a plurality of shoes, each comprising a tread portion having a pair of spaced lugs projecting from one side thereof for receiving a second pair of spaced apart lugs on the adjacent side of the next adjacent shoe, pintles pivotally connecting the lugs of adjacent shoes, a V-shaped member comprising two converging truss arms, one of which ends in a single bearing block for receiving the pintle on one side of the shoe, and the other of which ends in a pair of spaced bearing blocks through which the pintle on the opposite side of the shoe passes, said last named bearing blocks being spaced apart for receiving the single bearing block of an adjacent shoe, a cross head at the juncture of said arms, a pin carried by said cross head and having its ends projecting therefrom, and a truss chain connecting the corresponding ends of said pins.

2. A track chain formed of a plurality of shoes, each comprising a tread portion having a pair of spaced lugs projecting from one side thereof for receiving a second pair of spaced apart lugs on the adjacent side of the next adjacent shoe, pintles pivotally connecting the lugs of adjacent shoes, a V-shaped member comprising two converging truss arms, one of which ends in a single bearing block for receiving the pintle on one side of the shoe, and the other of which ends in a pair of spaced bearing blocks through whch the pintle on the opposite side of the shoe passes, said last named bearing blocks being spaced apart for receiving the single bearing block of an adjacent shoe, and collapsible means for trussing the inner ends of said truss arms to each other.

3. A track chain formed of a plurality of shoes, each having a tread portion, hinge lugs projecting from opposite sides thereof, pintles for pivotally connecting said lugs with the lugs on adjacent shoes, and a member extending transversely of said shoe and comprising two inwardly converging arms, the outer ends of which are mounted on said pintles.

4. A shoe for a track chain comprising a tread portion having a truss arm extending inwardly from each of two opposite sides, the said truss arms converging at their inner ends, one of said truss arms being formed in two inwardly converging sections connected by a web portion which is concaved inwardly toward the center of the shoe to form a recess for receiving the truss arm of an adjacent shoe.

5. A tread member for a track chain shoe comprising a bottom plate, end and side plates diverging upwardly from said bottom plate, bridge members extending outwardly from the upper edges of said end plates, and brackets extending outwardly from said end members for supporting said bridge members.

6. A tread member for a track chain shoe comprising a bottom plate, end and side plates diverging upwardly from said bottom plate, and bridge members extending outwardly from the upper edges of said end plates.

7. A tread member for a track chain shoe comprising a bottom plate, end and side plates diverging upwardly from said bottom plate, and hinge lugs secured to one of said side plates and extending outwardly therebeyond.

8. A vehicle track for spaced load supporting wheels, comprising in combination a series of tread shoes having inter-fitting bearing lugs, a series of pintles passing through the inter-fitting bearing lugs of adjacent shoes to connect the shoes into a flexible endless tread chain for the load supporting wheels, a series of rigid truss arms formed separately from the shoes and connected to the tread chain solely by the shoe connecting pintles, each truss arm extending inwardly and transversely of a corresponding shoe, and having bearing blocks at opposite ends for receiving the pintles which pass through the bearing lugs at opposite sides of the corresponding shoe, and connections between the truss arms permitting the same to fold together in one direction to allow the tread chain to pass around the load supporting wheels but limiting relative movement in a reverse direction to prevent excessive inward deflection of the tread chain between the wheels.

9. A vehicle track for spaced load supporting wheels, comprising the combination of a series of tread shoes on which the load supporting wheels may bear and roll over the ground, each shoe having bearing lugs which interfit with bearing lugs on adjacent shoes, a series of rigid truss arms formed separately from the shoes, each truss arm lying inwardly and transversely of a corresponding shoe, and having bearing blocks at opposite ends aligning with bearing lugs of the corresponding shoe, connections between the truss arms permitting the same to fold together in one direction and limiting their separation in the reverse direction, and pintles passing through the bearing lugs of adjacent shoes and the bearing blocks of adjacent truss arms and forming the only connection between the shoes and truss arms to connect the same into a flexible endless chain.

10. A track chain for spaced vehicle wheels, comprising a flexible endless chain composed of a series of tread shoes and connecting pintles, a series of independently removable but inter-connected rigid trussing elements formed separately from the shoes and connected to the tread chain solely by the pintles between the shoes thereof, each trussing element extending between and being carried by the pintles at opposite sides of one shoe.

11. A track chain for providing a rigid tread for spaced load supporting wheels, comprising a series of shoes having parallel wheel tread surfaces on their inner faces and bearing lugs at opposite sides, the bearing lugs of adjacent shoes interfitting with each other, a series of pintles connecting the shoes into a flexible endless tread chain, each pintle passing through interfitting bearing lugs of two shoes, and a series of interlocked rigid trussing elements formed independently of the shoes and attached to the tread chain solely by the pintles thereof, each trussing element lying inwardly of a shoe and receiving the pintles at opposite sides thereof, whereby the pintles serve to connect the trussing elements to the tread chain, and the interlocking of the trussing elements stiffen the tread chain between the wheels.

In witness whereof, I hereunto subscribe my name this 10th day of January, 1923.

ISAAC H. ATHEY.